(12) United States Patent
Sugiyama et al.

(10) Patent No.: US 7,993,206 B2
(45) Date of Patent: Aug. 9, 2011

(54) TORQUE FLUCTUATION ABSORBER

(75) Inventors: Masataka Sugiyama, Toyota (JP);
Takeshi Kanayama, Toyota (JP); Koichi Kondo, Toyoake (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 343 days.

(21) Appl. No.: 12/277,832

(22) Filed: Nov. 25, 2008

(65) Prior Publication Data

US 2009/0139825 A1 Jun. 4, 2009

(30) Foreign Application Priority Data

Nov. 29, 2007 (JP) ................. 2007-309085

(51) Int. Cl.
*F16F 15/121* (2006.01)
(52) U.S. Cl. ...................................... 464/68.7
(58) Field of Classification Search ............ 464/46, 464/68.7; 192/213.1–213.12
See application file for complete search history.

(56) References Cited

U.S. PATENT DOCUMENTS

| 4,559,024 | A | * | 12/1985 | Tamura et al. | ....... 192/213.12 X |
| 5,695,032 | A | * | 12/1997 | Murata et al. | ........... 464/68.7 X |

FOREIGN PATENT DOCUMENTS

| JP | 61-41019 | 2/1986 |
| JP | 63-62648 | 4/1988 |
| JP | 1-96546 | 6/1989 |
| JP | 9-126275 | 5/1997 |
| JP | 2002-39210 | 2/2002 |

\* cited by examiner

*Primary Examiner* — Gregory Binda (74) *Attorney, Agent, or Firm* — Oblon, Spivak, McClelland, Maier & Neustadt, L.L.P.

(57) ABSTRACT

A torque fluctuation absorber, including: an output plate that is rotatably disposed; a first rotating plate disposed for movement in the direction of rotation of the output plate relatively from the output plate; a first elastic member engaged with the output plate and the first rotating plate and capable of transmitting the power applied to the first rotating plate to the output plate; a second elastic member to which the power from a power source is applied and capable of transmitting the power to the first rotating plate; and a power transmission control mechanism. The power transmission control mechanism is located radially outside the first elastic member about an axis of rotation. The second elastic member is spaced from the first elastic member and the power transmission control mechanism in the direction of the axis of rotation. The first elastic member and the second elastic member are arranged radially offset.

14 Claims, 8 Drawing Sheets

TORQUE FLUCTUATION ABSORBER

INCORPORATION BY REFERENCE

The disclosure of Japanese Patent Application No. JP-2007-309085 filed on Nov. 29, 2007 including the specification, drawings and abstract is incorporated herein by reference in its entirety.

BACKGROUND OF THE INVENTION

1. Field of the Invention

The present invention relates to a torque fluctuation absorber.

2. Description of the Related Art

A damper disc provided between an output shaft of an engine and an input shaft of a transmission or the like, a torque fluctuation absorber with a torque limiter, and so on are known.

For example, Japanese Patent Application Publication No. 61-41019 (JP-A-61-41019) describes a damper disc having an annular side-plate having an input portion along its outer periphery; a flange; and spring mechanisms received in window holes defined by the side plate and the flange.

Japanese Patent Application Publication No. 2002-39210 (JP-A-2002-39210) describes a torque fluctuation absorber having a torque limiter portion, which includes: a driven plate spline-fitted to a driven side input shaft; drive plates disposed on both sides of the driven plate; and spring dampers received in window holes defined by the driven plate and the drive plates.

However, the damper disc described in JP-A-61-41019 has a limitation on the size of the window holes to ensure that the side plate and the flange have sufficient rigidity. Thus, the size of the springs which can be received in the window holes is limited.

The torque fluctuation absorber described in JP-A-2002-39210 also has a limitation on the size of the window holes to ensure that drive plates and driven plate have sufficient rigidity, and therefore the size of the spring dampers which can be received in the window holes is limited.

As described above, the damper disc and the torque fluctuation absorber have a limitation on the size of the spring dampers or the like which can be used therein. Therefore, when the power from a power source, such as an engine, is transmitted to an output portion, such as a transmission, there arises a problem that the torque fluctuations cannot be sufficiently absorbed, causing vibration to the entire transmission.

On the other hand, there is a tendency that the space that can be allocated for a torque fluctuation absorber in an engine compartment is decreasing, therefore the demand for reduction in size of torque fluctuation absorbers is increasing.

SUMMARY OF THE INVENTION

The present invention provides a torque fluctuation absorber which is capable of reducing fluctuations in power applied thereto from a power source before delivering the power to an output part and which is made compact.

A first aspect of the present invention relates to a torque fluctuation absorber. The torque fluctuation absorber includes: an output plate that is rotatably disposed; a first rotating plate disposed for movement in the direction of rotation of the output plate relatively from the output plate; a first elastic member engaged with the output plate and the first rotating plate and capable of transmitting the power applied to the first rotating plate to the output plate; a second elastic member to which the power from a power source is applied and capable of transmitting the power to the first rotating plate; and a power transmission control mechanism capable of controlling the torque to be applied from the second elastic member to the first rotating plate. The power transmission control mechanism is located radially outside the first elastic member about an axis of rotation. The second elastic member is spaced from the first elastic member and the power transmission control mechanism in the direction of the axis of rotation. The first elastic member and the second elastic member are arranged radially offset.

A second aspect of the present invention relates to a torque fluctuation absorber. The torque fluctuation absorber includes: an output plate disposed for rotation about an axis of rotation; a first rotating plate disposed for movement in the direction of rotation of the output plate relatively from the output plate; a first elastic member engaged with the output plate and the first rotating plate and capable of transmitting the power applied to the first rotating plate to the output plate; an input plate which is rotatably disposed and to which power is applied from a power source; a second rotating plate disposed for movement relatively from the input plate in the direction of rotation of the input plate and capable of transmitting power to the first rotating plate; and a second elastic member engaged with the input plate and the second rotating plate and capable of transmitting the power applied to the input plate to the second rotating plate. The first elastic member and the second elastic member are arranged radially offset about the axis of rotation.

According to the torque fluctuation absorber of the above aspects, since fluctuations in the power applied from a power source can be reduced before the power is delivered to an output part, generation of vibration can be reduced and the device itself can be made compact in size.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

A torque fluctuation absorber 100 according to the embodiments will be described with reference to FIG. 1 to FIG. 13. In the embodiment described below, the scope of the present invention is not necessarily limited to the quantity, unless otherwise stated. Also, each constituent element in the embodiment is not necessarily essential to the present invention, unless otherwise stated. Further, the characteristic features of the embodiments may be combined as needed, unless otherwise stated.

Figure 1:
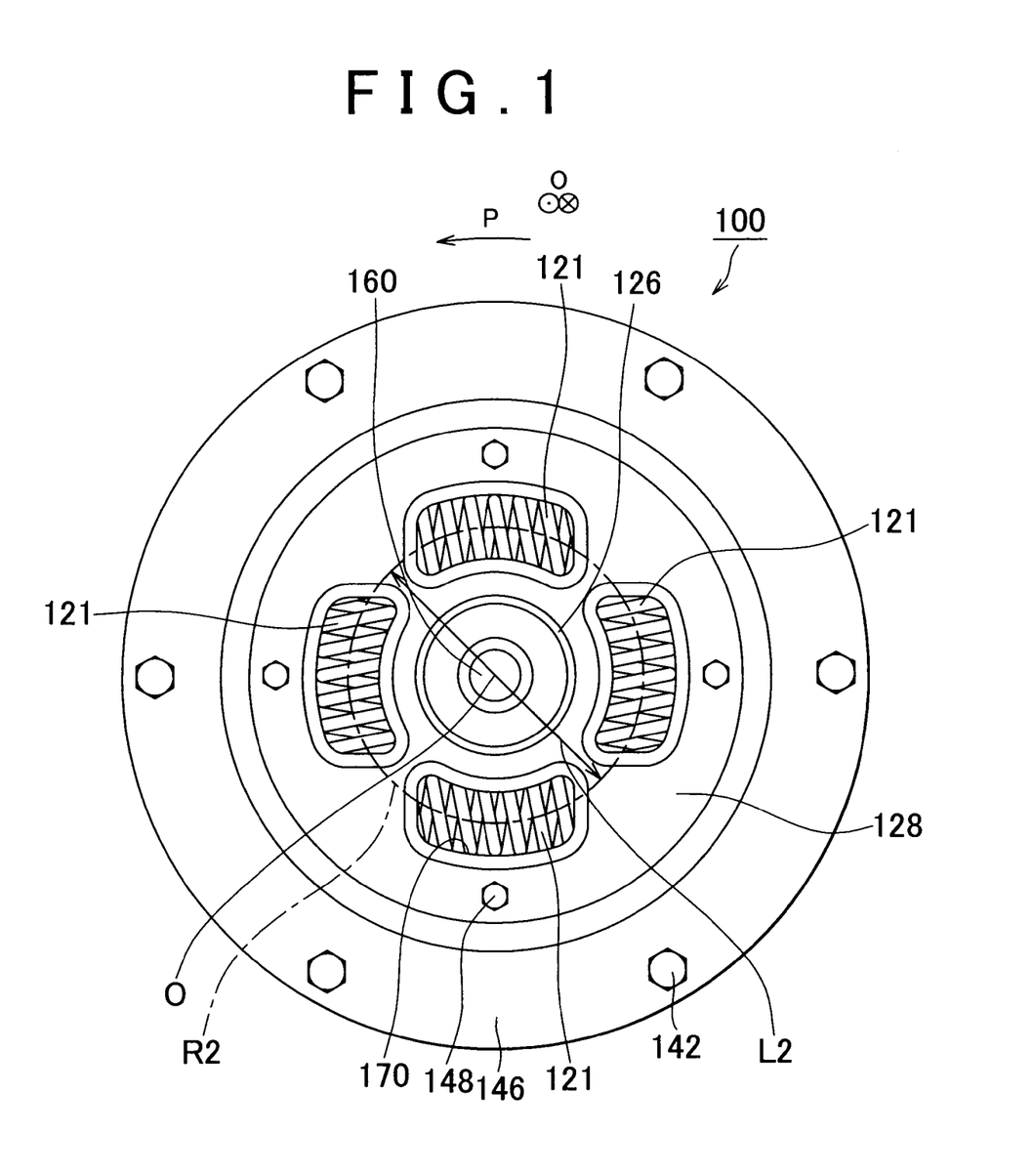
FIG. 1 is a front view of a torque fluctuation absorber according to a first embodiment of the present invention.
Figure 2:
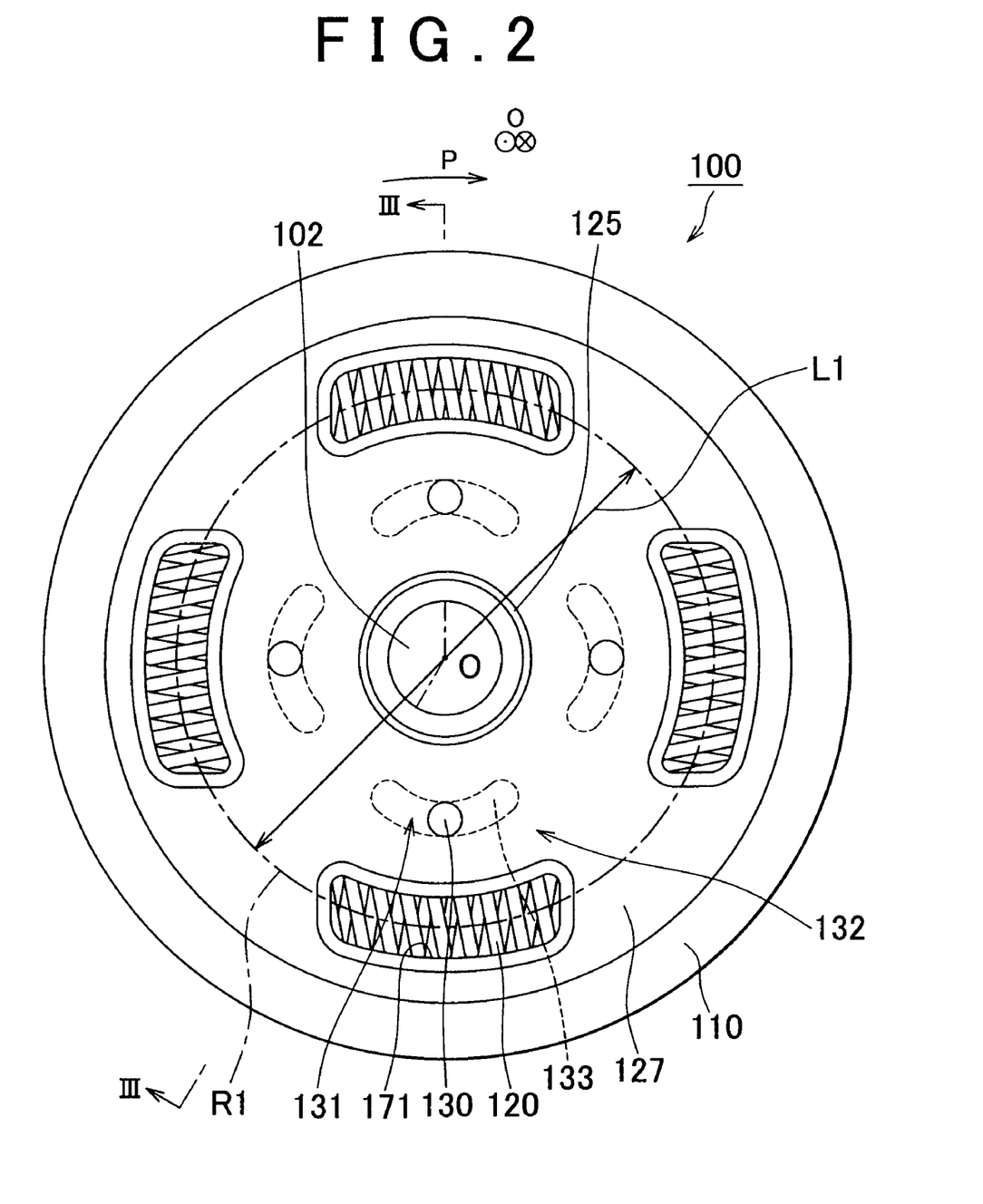
FIG. 2 is a rear view of the torque fluctuation absorber.
Figure 3:
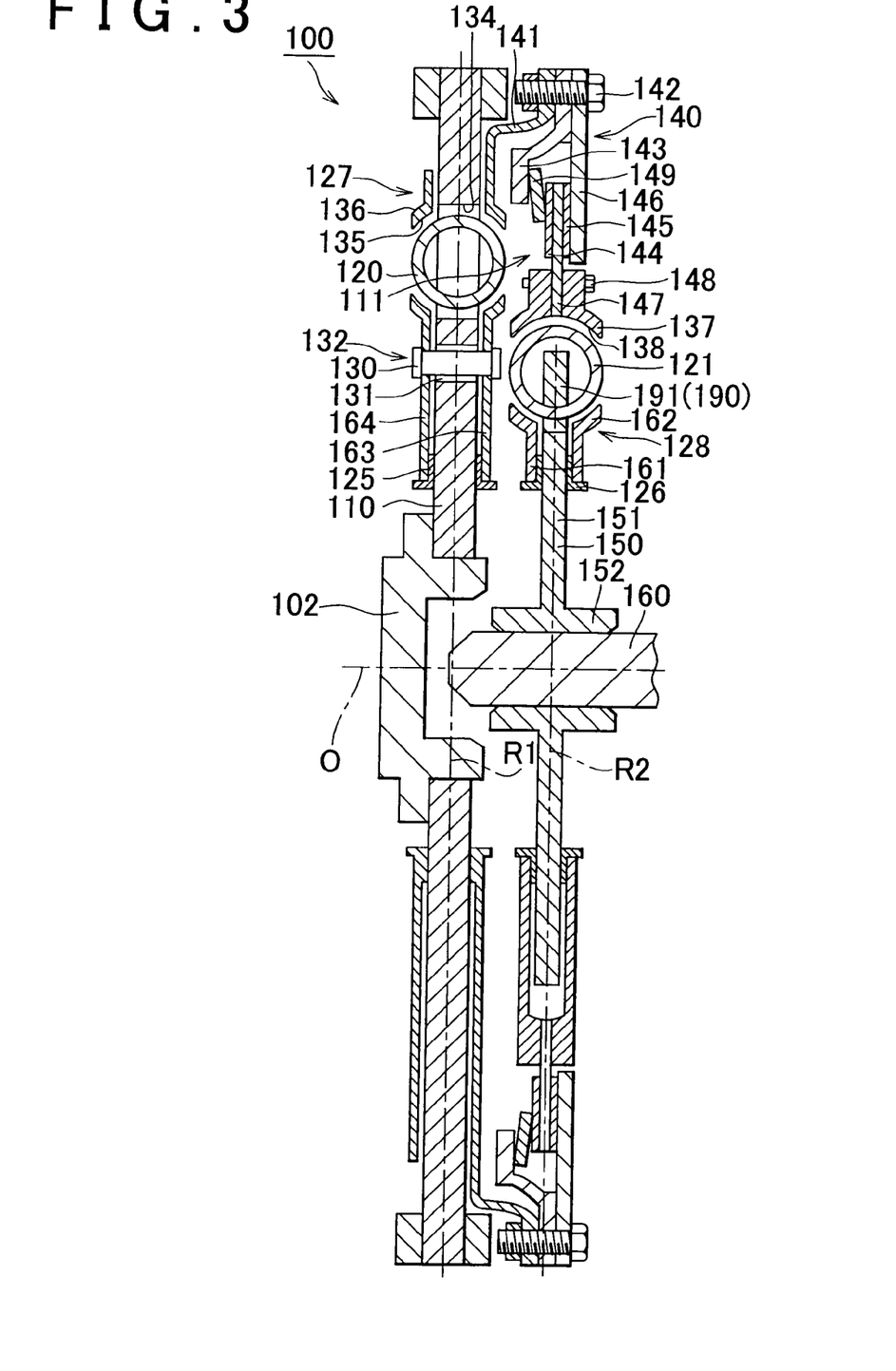
FIG. 3 is a cross-sectional view taken along the line III-III of FIG. 2.

(First Embodiment) A torque fluctuation absorber 100 according to a first embodiment will be described with reference to FIG. 1 to FIG. 12. FIG. 1 is a front view of the torque fluctuation absorber 100 according to the first embodiment, and FIG. 2 is a rear view of the torque fluctuation absorber 100. FIG. 3 is a cross-sectional view taken along the line III-III of FIG. 2.

In FIG. 3, the torque fluctuation absorber 100 has: a hub (output plate) 150 to which a transmission input shaft 160 is spline-fitted and which the hub is disposed to rotate about a rotation axis O; a drive plate (first rotating plate) 128 disposed to rotate relatively from the hub 150 in the direction of the rotation of the hub 150; and spring dampers (first elastic member) 121 that engage with the drive plate 128 and the hub 150.

The torque fluctuation absorber 100 also has a flywheel 110 secured to a crankshaft 102 that is driven to rotate about a rotation axis O by power from an engine; a drive plate 127 relatively moves in the direction of the rotation of the flywheel 110; and spring dampers 120 engage with both the drive plate 127 and the flywheel 110. The rotation axis O of the transmission input shaft 160 and the rotation axis O of the crankshaft 102 are coaxial with each other, and the crankshaft 102 rotates about the rotation axis O.

The drive plate 127 is capable of transmitting power to the drive plate 128 via a torque limiter 140. The torque limiter 140 is located between the drive plate 127 and the drive plate 128, and is capable of controlling the torque to be transmitted from the drive plate 127 to the drive plate 128.

When the engine is driven, the crankshaft 102 and the flywheel 110 rotate about the rotation axis O. When the flywheel 110 rotates, power is transmitted from the flywheel 110 to the drive plate 127 via the spring dampers 120. At this time, even if the power (torque) from the engine applied to the crankshaft 102 and the flywheel 110 fluctuates, the spring dampers 120 deform to attenuate the fluctuation in the torque transmitted to the drive plate 127. Therefore, the power applied from the spring dampers 120 to the drive plate 127 has smaller fluctuations than the power applied from the engine to the flywheel 110.

Then, the power applied to the drive plate 127 is transmitted to the drive plate 128 via the torque limiter 140. When power is transmitted to the drive plate 128, the drive plate 128 rotates relatively from the hub 150.

When the drive plate 128 rotates, the power is transmitted from the drive plate 128 to the spring dampers 121 that engage with the drive plate 128 and the hub 150, then the spring dampers 121 transmit the power to the hub 150.

At this time, even if the power transmitted from the drive plate 128 to the spring dampers 121 fluctuates, the spring dampers 121 deform to reduce the torque fluctuations before transmitting the torque to the hub 150.

Therefore, the power applied from the spring dampers 121 to the hub 150 has smaller fluctuation than the fluctuation when the power applied from the spring dampers 120 to the drive plate 128 via the drive plate 127 and the torque limiter 140.

Then, the torque applied to the hub 150 is transmitted to the transmission input shaft 160 by the hub 150.

As described above, according to the torque fluctuation absorber 100, the spring dampers 120 and the spring dampers 121 are connected in series in the power transmission route from the crankshaft 102 to the transmission input shaft 160.

Thus, the fluctuations in the power applied from the engine to the crankshaft 102 can be attenuated while the power is transmitted from the crankshaft 102 to the transmission input shaft 160, and it is therefore possible to prevent vibration from occurring in the transmission connected to the transmission input shaft 160.

As shown in FIG. 1, the spring dampers 121 are equally spaced located circumferentially along a virtual circle R2 about the rotation axis O.

As shown in FIG. 2, the spring dampers 120 are equally spaced located circumferentially along a virtual circle R1 about the rotation axis O. The virtual circle R1 and the virtual circle R2 are both perpendicular to the rotation axis O, and the virtual circle R1 and the virtual circle R2 are spaced from each other in the direction of the rotation axis O.

The spring dampers 120 and the spring dampers 121 are spaced from each other in the radial direction of the hub 150 (virtual circles R1 and R2) as seen in a plan view from the direction of the rotation axis O. Thus, some portions of the spring dampers 120 and members that support the spring dampers 120 can be arranged to overlap some portions of the spring dampers 121 and members that support the spring dampers 121 in a radial direction. This partially overlapping allows a reduction in size of the torque fluctuation absorber 100 in the direction of the rotation axis O.

As shown in FIG. 1 and FIG. 2, the diameter L1 of the virtual circle R1 is larger than the diameter L2 of the virtual circle R2, and the spring dampers 120 are located outside the spring dampers 121 in the radial direction of the virtual circle R1 and R2 as seen in a plan view seen in the direction of the rotation axis O.

Thus, even if the length of the spring dampers 120 is longer than that of the spring dampers 121, the spring dampers 120 can be sufficiently spaced from each other to ensure that the flywheel 110 and the drive plate 127 have sufficient rigidity.

Therefore, in the torque fluctuation absorber 100 according to the first embodiment, the length of the spring dampers 120 is longer than that of the spring dampers 121. Since spring dampers with a longer stroke are used as the spring dampers 120 as described above, the torsional rigidity of the spring dampers 120 may be set lower than that of the spring dampers 121.

As a result, the torsional rigidity of the entire torque fluctuation absorber 100 can be reduced, and the torque fluctuation absorber 100 can attenuate the torque fluctuations in the torque applied thereto from the crankshaft 102 more effectively before transmitting the torque to the transmission input shaft 160.

In addition, the spring dampers 120 are located on the input side (on the crankshaft 102 side) from the spring dampers 121 in the power transmission route.

Since the spring dampers 120 with a smaller elastic modulus are disposed on the upstream side in the power transmission route, as described above, the torque fluctuations from the crankshaft 102 can be significantly attenuated at an early stage in the route. Accordingly, the fluctuations in the power to be transmitted through the torque fluctuation absorber 100 can be reduced, and the torque fluctuation absorber 100 itself is prevented from vibrating.

The hub 150 has a cylindrical portion 152 formed to receive the transmission input shaft 160, and has a disc portion 151 extending from an outer periphery of the cylindrical portion 152.

The drive plate 128 has an inner plate 161 disposed on one of the main surface of the disc portion 151, that aligned in the direction of the rotation axis O, which faces the flywheel 110, and the drive plate 128 has an outer plate 162 disposed on the opposite side of the inner plate 161 with respect to the disc portion 151. The inner plate 161 and the outer plate 162 are integrated with each other by rivets 148, and the disc portion 151 is sandwiched therebetween via friction plates (frictional force applying members) 126. As shown in FIG. 1, the drive plate 128 has a disc-like shape.

In FIG. 3, the drive plate 127 has an inner plate 163 disposed on one of the main surfaces of the flywheel 110, that aligned in the direction of the rotation axis O which faces the disc portion 151, and the drive plate 127 has an outer plate 164 disposed on the opposite side of the inner plate 163 with respect to the flywheel 110. The inner plate 163 and the outer plate 164 are integrated with each other by a rivet 130, and the flywheel 110 is sandwiched therebetween via friction plates 125. As shown in FIG. 2 and FIG. 3, the drive plate 127 and the drive plate 128 have disc-like shapes.

Figure 4:
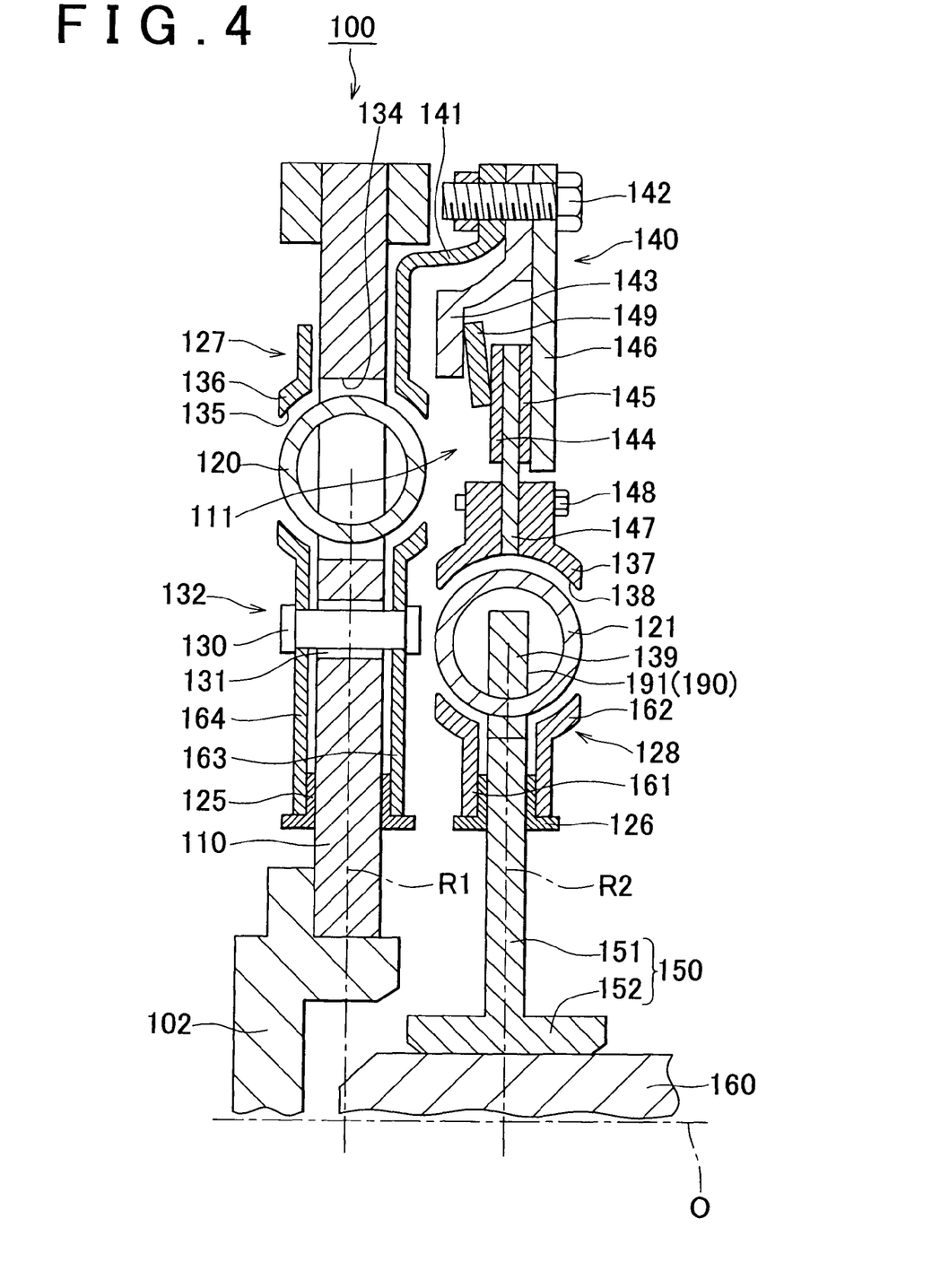
FIG. 4 is a cross-sectional view of the torque fluctuation absorber illustrating the configuration of a torque limiter thereof and its surroundings.

FIG. 4 is a cross-sectional view of the torque fluctuation absorber 100 illustrating the configuration of a torque limiter 140 and the surroundings thereof. The torque limiter 140 is located radially outside the spring dampers 120 and the drive plate 128.

The torque limiter 140 has an annular holding plate 146 located radially outside the drive plate 128 and has a brake plate 147, supported by the drive plate 128, extending in the radial direction of the virtual circle R2 from the outer peripheral edge of the drive plate 128.

On both sides of the brake plate 147, lining portions 144 and 145 are attached along the outer periphery thereof. The lining portion 145 is in contact with the one of the surfaces of the holding plate 146, that is the surface facing the flywheel 110.

The torque limiter 140 also has: an extended portion 141 extending from the drive plate 127; a disc spring 149 that presses the lining portion 144 toward the holding plate 146; and a supporting plate 143 that supports the disc spring 149. The supporting plate 143, the holding plate 146 and the extended portion 141 are joined integrally by bolts 142. The brake plate 147, which has an annular shape, is supported by the drive plate 128 and secured to the drive plate 128 by the rivets 148.

The holding plate 146 is joined integrally to the drive plate 127 via the extended portion 141. Thus, the holding plate 146 is rotatable together with the drive plate 127.

Since the disc spring 149 presses the lining portion 144, the lining portion 145 is pressed against the holding plate 146 to ensure surface pressure between the lining portion 145 and the holding plate 146.

Thus, when the holding plate 146 rotates, the lining portions 145 and 144 and the brake plate 147 are rotatable together with the holding plate 146, because of the friction between the lining portion 145 and the holding plate 146.

The torque applied to the drive plate 127 is transmitted to the extended portion 141 via the crankshaft 102, the flywheel 110 and the spring dampers 120, and is then transmitted to the holding plate 146 via the extended portion 141. When the torque transmitted to the holding plate 146 exceeds a threshold and exceeds the frictional force between the lining portion 145 and holding plate 146, the lining portion 145 and the brake plate 147 start sliding relatively from the holding plate 146.

Thus, the torque to be applied to the drive plate 128 is prevented from exceeding the threshold to prevent excessive torque from being transmitted to the transmission. As a result, the transmission can be prevented from violently vibrating to prevent generation of vibration noise etc.

The part of the torque limiter 140 between the drive plate 128 and the holding plate 146 (radially inner part) is formed only by the brake plate 147.

The part radially outside the radially inner part, that is the radially outer part, is formed by the brake plate 147, the holding plate 146 and the lining portions 144 and 145. Therefore, the thickness in the direction of the rotation axis O of the radially outside part is greater than that of the radially inner part. The disc spring 149 and the supporting plate 143 are disposed radially outside the radially outer part, and therefore, the thickness of this part of the torque limiter 140 in the direction of the rotation axis O is further greater than that of the radially inner part.

As described above, the thickness of the torque limiter 140 in the rotation axis O direction increases radially outward from the outer peripheral edge of the drive plate 128. In addition, the lining portions 144 and 145, the disc spring 149 and the supporting plate 143 are all disposed on the flywheel 110 side with respect to the holding plate 146.

The drive plate 128 has receiving parts 138 that receive the spring dampers 121 in a part radially inside the outer peripheral edge thereof, and the drive plate 128 has overhanging portions 137 extending along the outer peripheries of the spring dampers 121. Thus, the thickness of the drive plate 128 in the direction of the rotation axis O is greater at the overhanging portions 137 located radially inside the outer peripheral edge than at the outer peripheral edge.

A recess 111 is defined by the drive plate 128 and the torque limiter 140. The recess 111 is open toward the flywheel 110.

The spring dampers 120 are located on the open side of the recess 111 with respect to the drive plate 128 and the torque limiter 140. Thus, the spring dampers 120, the members supporting the spring dampers 120 and so on can be placed in the recess 111. Therefore, the flywheel 110 and the hub 150 can be disposed close to each other, and the size of the torque fluctuation absorber 100 can be made compact in the direction of the rotation axis O.

The flywheel 110 has a plurality of receiving holes 134 formed circumferentially spaced, and the spring dampers 120 are received in respective receiving holes 134. The spring dampers 121 are respectively received in a plurality of recesses 139 formed circumferentially spaced in the outer peripheral edge of the disc portion 151. Since the spring dampers 120 and the spring dampers 121 are received in the flywheel 110 and the hub 150 respectively as described above, the width of the torque fluctuation absorber 100 in the direction of the rotation axis O can be reduced to make the torque fluctuation absorber 100 compact in size.

The drive plate 127 has overhanging portions 136 extending along the outer peripheries of the spring dampers 120, and receiving parts 135, that can receive the spring dampers 120, are formed between the outer plate 164 and the inner plate 163.

The drive plate 128 has overhanging portions 137 extending along the outer peripheries of the spring dampers 121, and receiving parts 138, that can receive the spring dampers 121, are formed between the outer plate 162 and the inner plate 161.

Figure 5:
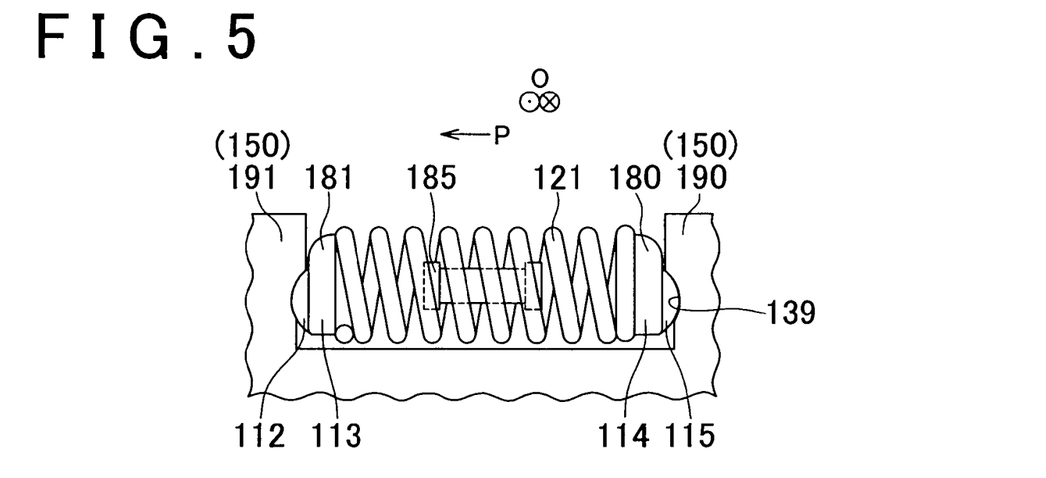
FIG. 5 is a front view illustrating a recess formed in a hub and a spring damper received in the recess.

FIG. 5 is a front view illustrating a recess 139 of the hub 150 and a spring damper 121 received in the recess 139.

As shown in FIG. 5, a coil end supporting member 180 and a coil end supporting member 181 are attached on both ends of each spring damper 121.

The coil end supporting members 180 and 181 respectively have engaging portions 114 and 113 to which ends of the corresponding spring damper 121 are connected and respectively have bulged-out portions 115 and 112 formed on outer surfaces of the engaging portions 114 and 113.

The bulged-out portions 112 and 115 are formed thinner than the engaging portions 113 and 114, and step portions are formed between the bulged-out portions 112 and 115 and the engaging portions 113 and 114.

When the torque fluctuation absorber 100 is not driven, the coil end supporting member 180 and the coil end supporting member 181 are respectively in contact with a side wall portion 190 and a side wall portion 191 that define the recess 139.

The inner walls of the sidewall portions 191 and 190 have recesses that can receive the bulged-out portions 112 and 115 bulging out sideways so that the bulged-out portions 112 and 115 are engageable with the sidewall portions 191 and 190, respectively.

A cushion resin 185 which is elastically deformable is disposed in each spring damper 121. The cushion resins 185 have an elastic modulus which is higher than those of the spring dampers 120 and the spring dampers 121, and are less elastically deformable than the spring dampers 120 and the spring dampers 121.

Figure 6:
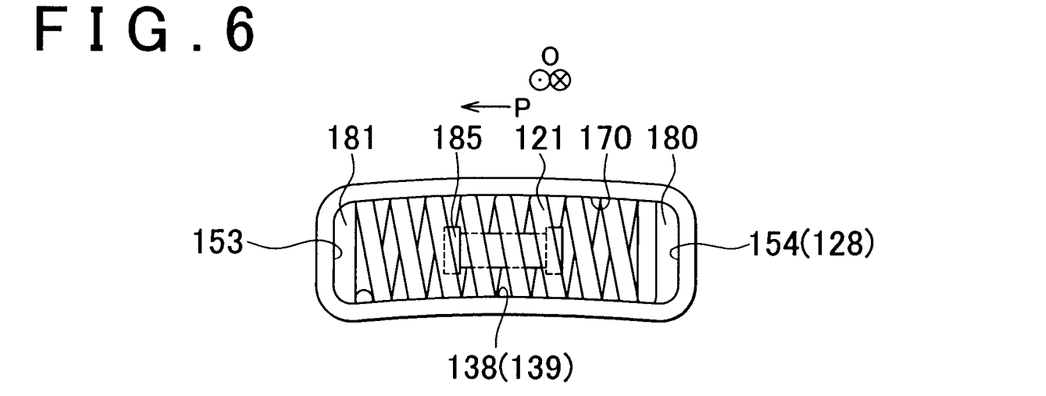
FIG. 6 is a front view of that part of a drive plate where a receiving part is located.

FIG. 6 is a front view of that part of the drive plate 128 at which a receiving part 138 is located. In FIG. 6, when the torque fluctuation absorber 100 is not driven, each receiving part 138 and the corresponding recess 139 are in line with each other in the direction of the rotation axis O. Each receiving part 138 has an opening 170 which is circumferentially elongated. A side edge portion 154 at one end of each opening 170 is engaged with the corresponding engaging portion 114 shown in FIG. 5 and the other side edge portion 153 thereof is engaged with the corresponding engaging portion 113.

Figure 7:
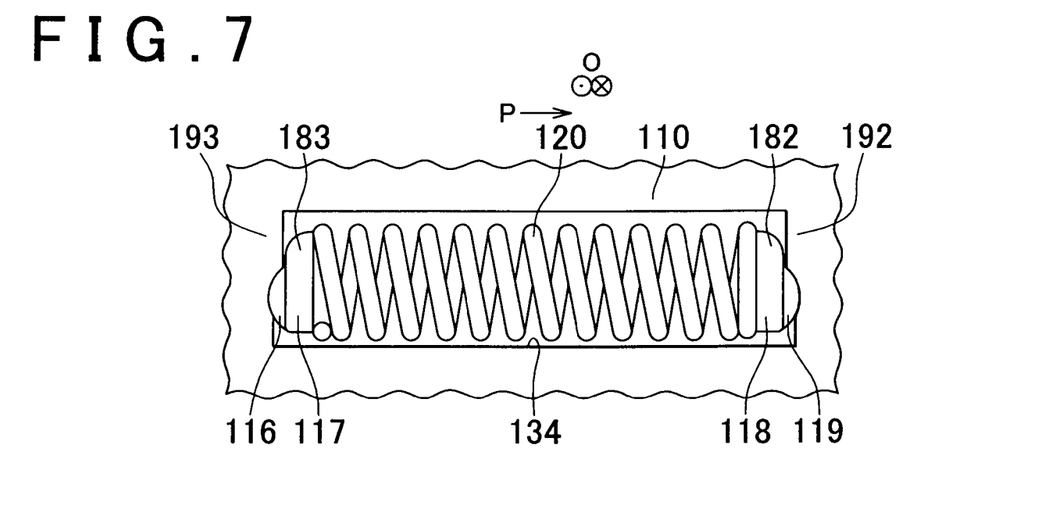
FIG. 7 is a front view of a receiving hole and a spring damper received in the receiving hole.

FIG. 7 is a front view of a receiving hole 134 and a spring damper 120 received in the receiving hole 134. As shown in FIG. 7, coil end supporting members 182 and 183 are attached to opposite ends of each spring damper 120.

The coil end supporting members 182 and 183 respectively have engaging portions 118 and 117 to which ends of the corresponding spring damper 120 are connected, and respectively have bulged-out portions 119 and 116 formed on outer surfaces of the engaging portions 118 and 117. The engaging portions 118 and 117 are formed thicker than the bulged-out portions 119 and 116, and step portions are formed between the engaging portions 118 and 117 and the bulged-out portions 119 and 116.

Each receiving hole 134 has a sidewall portion 192 and a sidewall portion 193 defining a part thereof and having recesses that can receive the bulged-out portion 119 and bulged-out portion 116, respectively. The bulged-out portion 119 and the bulged-out portion 116 are received in the corresponding recesses when the torque fluctuation absorber 100 is not driven.

Figure 8:
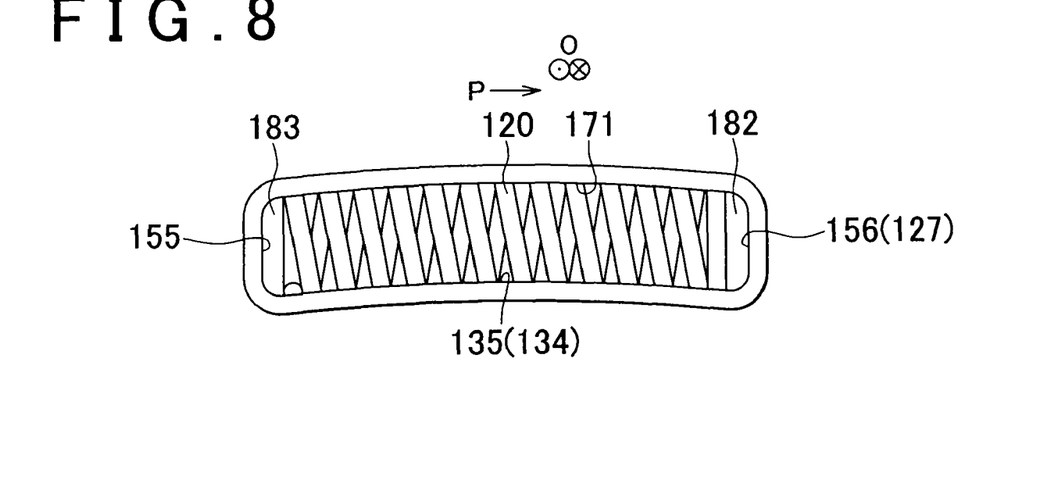
FIG. 8 is a front view of a receiving part and a spring damper received in the receiving part.

FIG. 8 is a front view of a receiving part 135 and a spring damper 120 received in the receiving part 135. As shown in FIG. 8, each receiving part 135 has an opening 171 having a side edge portion 156 and a side edge portion 155, which are engaged with the corresponding engaging portions 118 and 117 shown in FIG. 7.

In FIG. 7 and FIG. 8, each receiving part 135 formed in the drive plate 127 and the corresponding receiving hole 134 formed in the flywheel 110 are in line with each other in the direction of the rotation axis O in the initial state. When power is applied to the crankshaft 102 and the flywheel 110 starts to be displaced relatively from the drive plate 127, each receiving hole 134 is displaced forward in the rotational direction P relatively from the corresponding receiving part 135.

At this time, each coil end supporting member 182 is locked by the side edge portion 156 of the corresponding receiving part 135, and the other coil end supporting member 183 is pressed in the rotational direction P by the side wall portion 193 of the corresponding receiving hole 134. Then, as each sidewall portion 193 and the corresponding side edge portion 156 approach each other, each spring damper 120 is compressed.

Since each spring damper 120 is compressed as described above, each side edge portion 156 is pressed in the rotational direction P by the corresponding coil end supporting member 182.

Accordingly, the torque is transmitted to the drive plate 127. Then, as described above, even if the torque to be applied from the flywheel 110 to the spring dampers 120 fluctuates, the spring dampers 120 are deformed to reduce the fluctuations in the torque to be transmitted from each coil end supporting member 182 to the drive plate 127.

Then, the power applied to the drive plate 127 is transmitted to the drive plate 128 via the torque limiter 140 as described above.

Here, each receiving part 138 of the drive plate 128 and the corresponding recess 139 of the hub 150 are aligned in the direction of the rotation axis O in the initial state as shown in FIG. 5 and FIG. 6. When the torque is transmitted to the drive plate 128, the drive plate 128 is displaced forward in the rotational direction P relatively from the disc portion 151 of the hub 150 as shown in FIG. 5 and FIG. 6.

Each coil end supporting member 181 is supported by the corresponding sidewall portion 191 of the hub 150, and each coil end supporting member 180 is pressed forward in the rotational direction P by the corresponding side edge portion 154 of the drive plate 128.

Thus, the spring dampers 121 are elastically compressed. At this time, even if the torque to be applied from the drive plate 128 to the spring dampers 121 fluctuates, the spring dampers 121 can be elastically deformed to attenuate the torque fluctuations. Then, when the spring dampers 121 are compressed, power is applied from each sidewall portion 191 to the hub 150.

Figure 9:
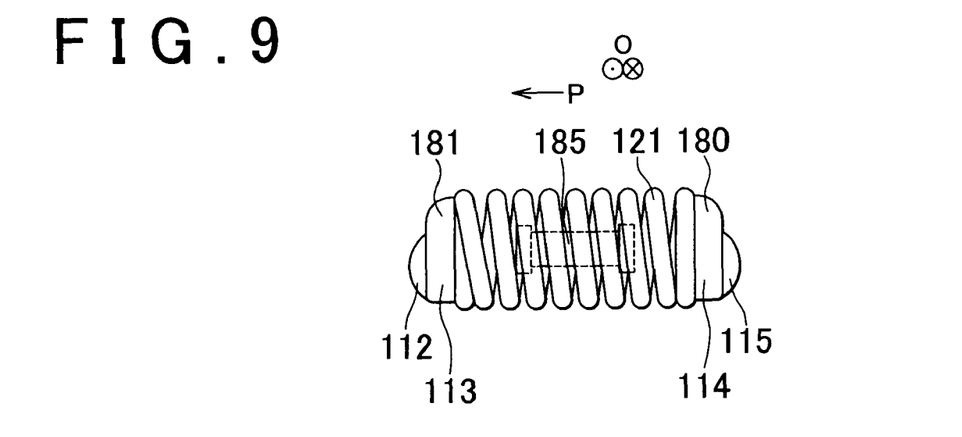
FIG. 9 is a front view of a spring damper and its surroundings showing a state of the spring damper during deformation.

FIG. 9 is a front view of a spring damper 121 and its surroundings showing a state of the spring damper 121 during the process of deformation. As shown in FIG. 9, when the torque applied from the engine is lower than the maximum torque of the engine, the opposite ends of each cushion resin 185 in each spring damper 121 are apart from the corresponding coil end supporting members 181 and 180.

As shown in FIG. 2 and FIG. 3, the torque fluctuation absorber 100 has stoppers 132 that regulate the torsion angle of the drive plate 127 relatively from the flywheel 110. Each stopper 132 is constituted of an inner peripheral surface of a slot 131 extending in the circumferential direction of the flywheel 110 and a rivet 130 inserted into the slot 131 and secured to the drive plate 127.

When each rivet 130 abuts against a circumferential end of an inner peripheral surface of the flywheel 110 defining the corresponding slot 131, the torsion angle of the drive plate 127 relatively from the flywheel 110 is regulated.

Figure 10:
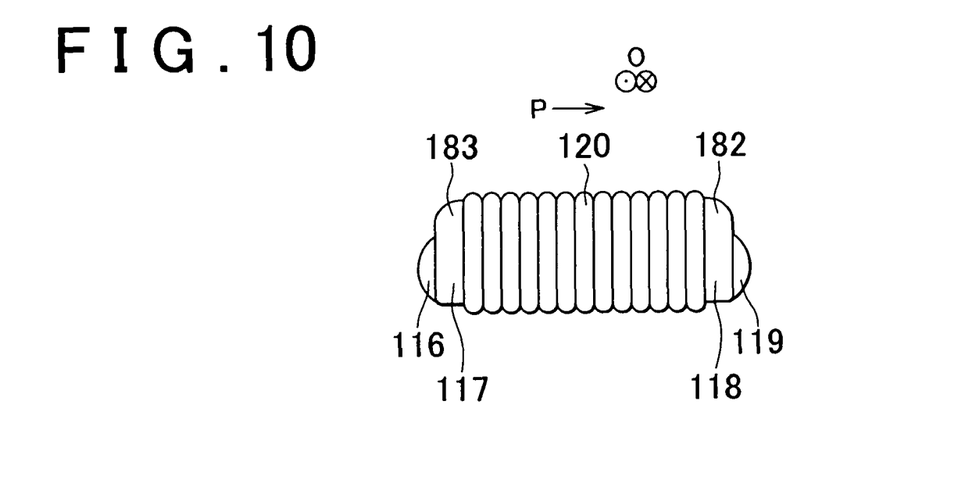
FIG. 10 is a front view of a spring damper at the time when stoppers are causing a flywheel and a drive plate to rotate together.

FIG. 10 is a front view of a spring damper 120 at a time when the stoppers 132 are functioning to cause the flywheel 110 and the drive plate 127 to rotate together.

As shown in FIG. 10, when the flywheel 110 and the drive plate 127 are rotating together by the function of the stoppers 132, the spring dampers 120 are almost fully compressed. At this time, since the stoppers 132 are inhibiting the flywheel 110 from moving forward in the rotational direction P relatively from the drive plate 127, the torque fluctuation attenuation of the spring dampers 120 will not function.

Figure 11:
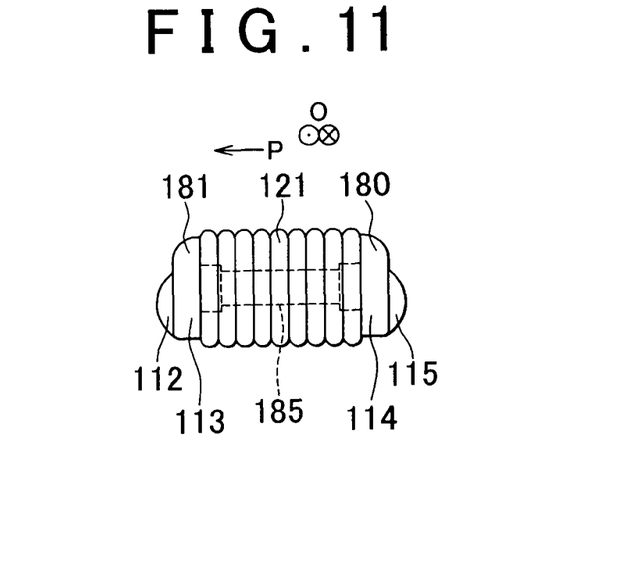
FIG. 11 is a front view of a spring damper at the time when the spring damper shown in FIG. 10 is being compressed completely.

In addition, FIG. 11 is a front view of a spring damper 121 at a time when the spring dampers 120 have been compressed completely.

In FIG. 11, when the torque fluctuation attenuation function of the spring dampers 120 is not functioning, each spring damper 121 can be still slightly compressed.

Since the cushion resins 185 have a natural length which is longer than that of the spring dampers 121 being completely compressed, one end of each cushion resin 185 in each spring damper 121 is in contact with the corresponding coil end supporting member 181 and the other end in contact with the corresponding coil end supporting member 180.

Thus, when each spring damper 121 receives a force that acts to further compress the spring damper 121 from the hub 150 and the drive plate 128, each cushion resin 185 elastically deforms.

The cushion resins 185 have an elastic modulus which is higher than those of the spring dampers 121 and the spring dampers 120. Since the cushion resins 185 perform their attenuation function as described above, an excessive torque is prevented from being transmitted to the transmission input shaft 160 and the transmission can be prevented from violently vibrating.

Figure 12:
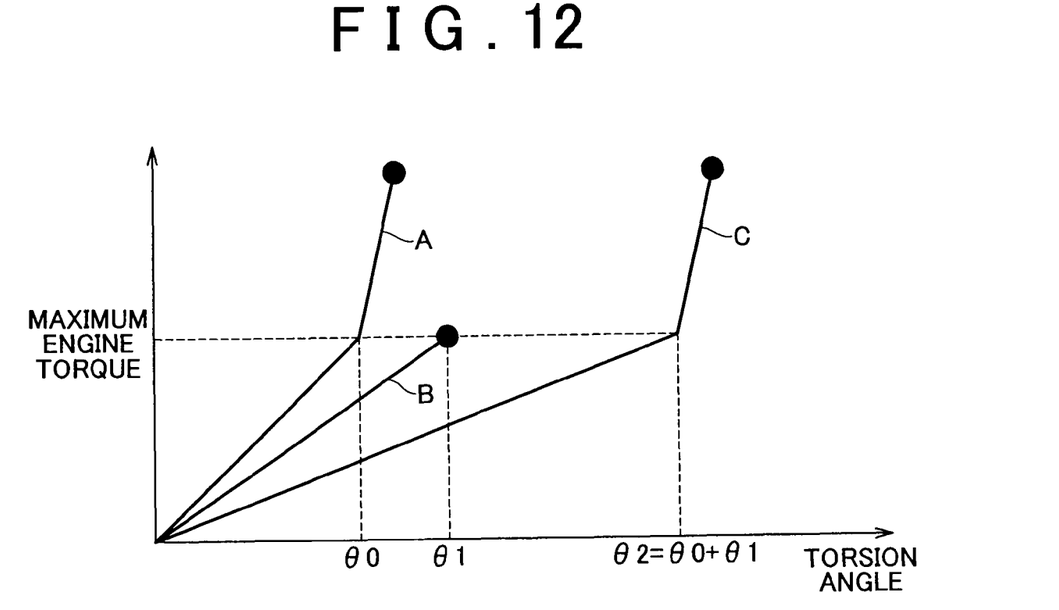
FIG. 12 is a graph showing the relationship between the input torque and the torsion angle in the case where only one type of spring dampers are functioning, the case where only one type of spring dampers and cushion resins are functioning, and the case where two types of spring dampers and cushion resins are all functioning; and, FIG. 13 is a schematic view illustrating the configuration of a clutch mechanism to which the torque fluctuation absorber according to a second embodiment of the present invention is applied.

FIG. 12 is a graph showing the relationship between the input torque and the torsion angle in the case where only the spring dampers 120 are functioning, the case where only the spring dampers 121 and the cushion resins 185 are functioning, and the case where the spring dampers 120, the spring dampers 121 and the cushion resins 185 are all functioning.

In FIG. 12, the line A represents the characteristic in the case where elastic members each constituted only of the spring damper 121 and the cushion resin 185 are functioning. In FIG. 12, the line B represents the characteristic in the case where only the spring dampers 121 are functioning. The line C represents the characteristic in the case where the spring dampers 121, the spring dampers 120 and the cushion resin 185 are functioning. In the graph of FIG. 12, the vertical axis represents the torque applied from the engine, and the horizontal axis represents the torsion angle of the drive plate 127 relatively from the flywheel 110, the torsion angle of the drive plate 128 relatively from the hub 150 or the torsion angle of the hub 150 relatively from the flywheel 110 which results when the elastic members are compressed.

Here, the line A indicates that the compression of the spring dampers 121 is completed when the power which the engine applies to the crankshaft 102 reaches the engine maximum torque and, after that, the cushion resins 185 function when the torque to be applied to the crankshaft 102 further increases.

It also indicates that the compression of the spring dampers 120 is completed when the torque applied to the crankshaft 102 from the engine reaches the engine maximum torque. In addition, the torsion angle θ1 in the line B case is greater than the torsion angle θ0 of the line A case. This indicates that the stroke of the spring dampers 120 is longer than that of the spring dampers 121. In addition, the fact that the gradient of the line A before the engine torque reaches the engine maximum torque is smaller than that of the line B. This indicates that the spring dampers 120 have a modulus of elasticity which is smaller than that of the spring dampers 121. Therefore, the torsional rigidity of the torque fluctuation absorber 100 can be further reduced when the spring dampers 121 and the spring dampers 120 are provided in series than when the two sets of spring dampers 121 are provided in parallel.

The line C indicates that when all the spring dampers 121, the cushion resins 185 and the spring dampers 120 are functioning, both the spring dampers 120 and the spring dampers 121 are elastically deformed to attenuate the torque fluctuations before the power applied to the crankshaft 102 reaches the engine maximum torque.

The graph also indicates that the torsion angle can be greater when the spring dampers 121 and the spring dampers 120 connected in series are used than when the spring dampers 121 or the spring dampers 120 are used individually.

Accordingly, the torque fluctuation absorber 100 functions well over a range of the engine torque from low to high to prevent generation of vibration and enable the power from the engine to be delivered to the transmission and so on efficiently, resulting in an increase in fuel efficiency.

The first embodiment is an example in which the torque fluctuation absorber 100 is applied to a hybrid vehicle. This is the reason why the torque fluctuation absorber 100 has the torque limiter 140.

Figure 13:
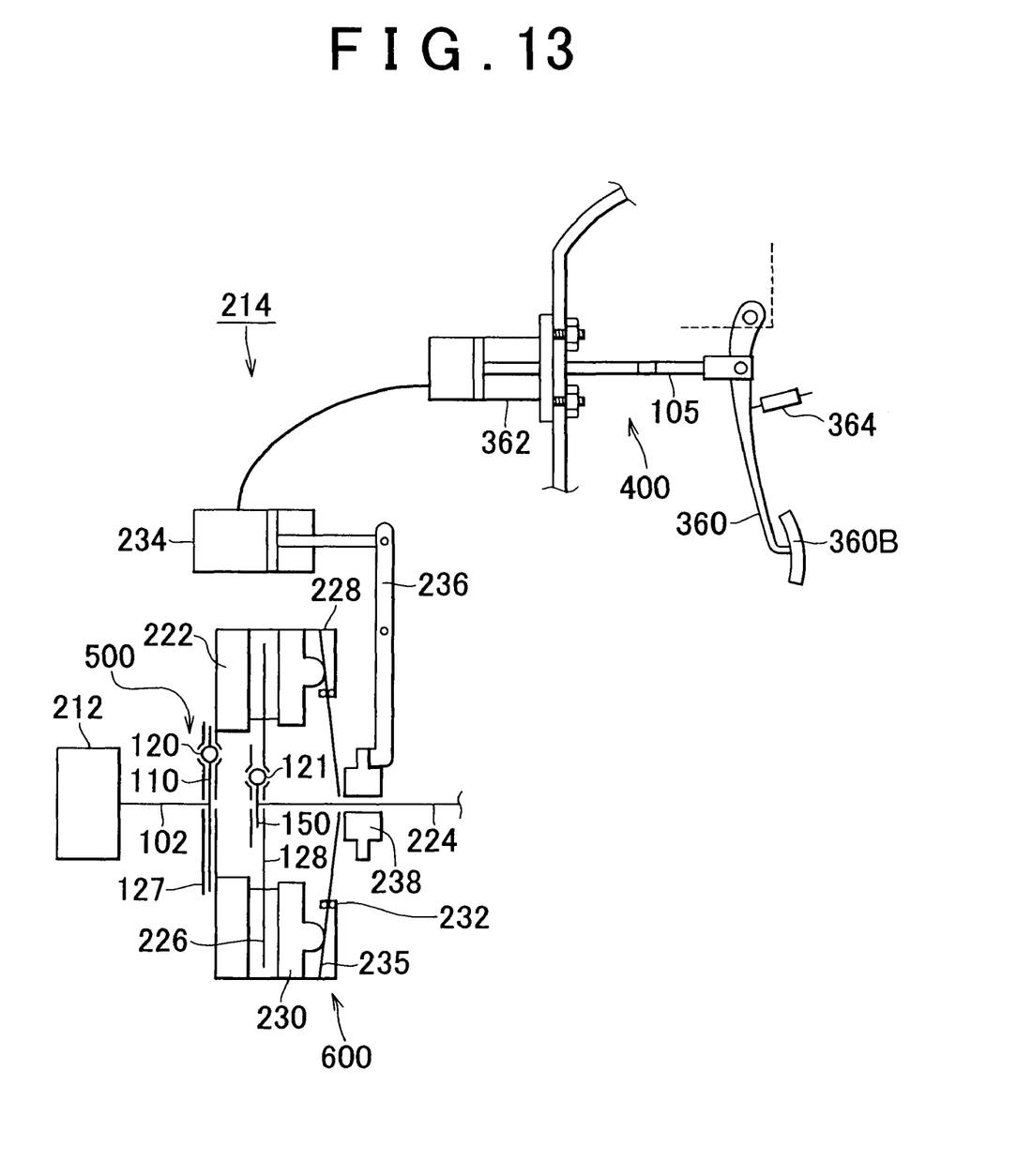

(Second Embodiment) Referring to FIG. 13, a torque fluctuation absorber 500 according to a second embodiment of the present invention is described. In FIG. 13, components that are the same as or similar to those in FIG. 1 to FIG. 11 are denoted by the same reference numerals and their detailed description may not be repeated. The second embodiment is an example in which the torque fluctuation absorber 500 is applied to a clutch mechanism of a manual transmission.

FIG. 13 is a schematic view illustrating the configuration of the clutch mechanism to which the torque fluctuation absorber 500 according to a second embodiment of the present invention is applied.

A clutch mechanism 214 shown in FIG. 13 connects and disconnects the power from an engine 212 to a transmission input shaft 224.

The clutch mechanism 214 includes the torque fluctuation absorber 500. The torque fluctuation absorber 500 has a power transmission mechanism 600 that transmits the power from the engine 212 to the transmission input shaft 224, and includes an operation mechanism 400 that can be operated by the driver to operate the power transmission mechanism 600.

The power transmission mechanism 600 has: a flywheel 110 secured to a crankshaft 102 to which the power from the engine 212 is transmitted; a drive plate 127; spring dampers 120; a pressure plate 222 provided along the outer peripheral edge of the drive plate 127; a hub 150 secured to the transmission input shaft 224; a drive plate 128; spring dampers 121; and a clutch facing 226 provided on both front and reverse sides of the drive plate 128 along the outer peripheral edge thereof.

The clutch mechanism 214 has a pressure plate 230 provided in a clutch cover 228 for back and forth movement relatively from the clutch facing 226 and capable of pressing the clutch facing 226 against the pressure plate 222 and has a diaphragm spring 235 capable of pressing the pressure plate 230.

The diaphragm spring 235 is deformable on a pivot ring 232, and has an annular shape.

The clutch mechanism 214 also has: a release bearing 238 that presses that part of the diaphragm spring 235 inside the inner periphery of the pivot ring 232 to deform the diaphragm spring 235; a fork 236 that moves the release bearing 238 back and forth relatively from the pivot ring 232; a clutch release cylinder 234; and a clutch master cylinder 362.

The operation mechanism 400 also has a pedal mechanism 360 operable by a foot of the driver to drive the clutch master cylinder 362.

When the driver depresses a pedal 360B of the pedal mechanism 360, a push rod 105 extending from the rod of the clutch master cylinder 362 increases the hydraulic pressure in the clutch master cylinder 362.

This increases the hydraulic pressure in the clutch release cylinder 234, then the fork 236 is driven by the clutch release cylinder 234.

Then, the fork 236 presses the release bearing 238 against an inner peripheral part of the diaphragm spring 235. This movement of the outer peripheral part of the diaphragm spring 235 against the pressure plate 230 is therefore released, and the pressure plate 230 is released from the clutch facing 226.

Then, the clutch facing 226, which has been pressed against the pressure plate 222, is released from the pressure plate 222. As a result, the torque transmitted to the pressure plate 222 is not transmitted to the transmission input shaft 224 via the clutch facing 226.

When the driver releases the pedal 360B, the pedal mechanism 360 is restored to the initial state by tensile force of an elastic member 364. Then, the distal end of the fork 236 is released from the release bearing 238. Thus, the diaphragm spring 235 presses the pressure plate 230, and the clutch facing 226 is pressed against the pressure plate 222. As a result, the power from the engine 212 is transmitted to transmission through the crankshaft 102, the flywheel 110, the spring dampers 120, the drive plate 127, the pressure plate 222, the clutch facing 226, the drive plate 128, the spring dampers 121, the hub 150, and the transmission input shaft 224 in sequence.

At this time, the spring dampers 120 can attenuate the fluctuations in the torque applied from the flywheel 110 before transmitting the torque to the drive plate 127. In addition, the spring dampers 121 can attenuate the fluctuations in the torque transmitted from the drive plate 128 before transmitting the torque to the hub 150.

Therefore, also in the clutch mechanism 214 according to the second embodiment, power is transmitted to the transmission input shaft 224 with attenuated torque fluctuations, and vibration of transmission and so on can be prevented.

The spring dampers 121 are located radially inside the pressure plate 222 and the clutch facing 226, and the spring dampers 120 are located on the open side of the recess defined between the spring dampers 121 and the pressure plate 222.

Thus, the spring dampers 120 and a part of the drive plate 127 are located in the recess defined by the spring dampers 121 and the pressure plate 222, which contributes to the reduction of the size of the clutch mechanism 214 in the direction of the rotation axis O to make the clutch mechanism 214 compact in size.

In addition, since the spring dampers 120 are located radially outside the spring dampers 121, the length of the spring dampers 120 can be larger than that of the spring dampers 121. Further, the spring dampers 120 and the spring dampers 121 in the second embodiment are configured and arranged in the same manner as in the first embodiment and therefore can provide the same effects as those set forth in the first embodiment.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A torque fluctuation absorber, comprising:
an output plate that is rotatably disposed;
a first rotating plate that is disposed so as to be movable relative to the output plate in a direction of rotation of the output plate;
a first elastic member that is engaged with the output plate and the first rotating plate, and that is capable of transmitting power applied to the first rotating plate to the output plate;
a second elastic member to which power from a power source is applied and which is capable of transmitting the applied power to the first rotating plate;
a power transmission control mechanism that is capable of controlling torque to be applied to the first rotating plate,
wherein the power transmission control mechanism is disposed on an outer side of the first elastic member in a radial direction of the output plate, and
wherein the second elastic member is disposed so as to be spaced from the first elastic member and the power transmission control mechanism in a direction of an axis of rotation of the output plate, and is disposed on an open side of a recess defined by the power transmission control mechanism and first rotating plate.

2. The torque fluctuation absorber according to claim 1, further comprising an input plate that is disposed so as to be rotatable by the power from the power source and that is capable of transmitting the power from the power source to the first elastic member,
wherein the input plate is disposed so as to be spaced from the first elastic member and the power transmission control mechanism in the direction of the axis of rotation of the output plate and is disposed on the open side of the recess, and is capable of receiving at least a part of the second elastic member.

3. The torque fluctuation absorber according to claim 2, further comprising a second rotating plate that is disposed so as to be movable relative to the input plate in a direction of rotation of the input plate,
wherein the second elastic member is engaged with the second rotating plate and the input plate, and the second rotating plate supports the second elastic member and is capable of transmitting power applied from the second elastic member to the first rotating plate.

4. The torque fluctuation absorber according to claim 3, wherein the second rotating plate has a receiving part that is disposed on a side of at least one of main surfaces of the input plate, which are aligned in the direction of the axis of rotation, and that is capable of receiving the second elastic member.

5. The torque fluctuation absorber according to claim 4, further comprising a cushion member having an elastic modulus that is greater than each of an elastic modulus of the first elastic member and an elastic modulus of the second elastic member,
  wherein the power source is an engine,
  wherein the first elastic member and the second elastic member are capable of attenuating fluctuations in torque applied from the engine in conjunction with each other and transmitting the torque to the output plate when the power transmitted from the engine is lower than a maximum torque of the engine, and
  wherein the cushion member is capable of attenuating fluctuations in torque applied from the engine in a route through which the power from the drive source is transmitted to the output plate and transmitting the torque to the output plate when the power transmitted from the engine is equal to or higher than the maximum torque of the engine.

6. The torque fluctuation absorber according to claim 5, wherein:
  the cushion member is disposed in at least one of the first elastic member and the second elastic member; and
  the cushion member has a natural length that is longer than a length of the one of the elastic members, in which the cushion member is disposed, measured when the elastic member is fully compressed.

7. The torque fluctuation absorber according to claim 3, further comprising a cushion member having an elastic modulus that is greater than each of an elastic modulus of the first elastic member and an elastic modulus of the second elastic member,
  wherein the power source is an engine, and
  wherein the first elastic member and the second elastic member are capable of attenuating fluctuations in torque applied from the engine in conjunction with each other and transmitting the torque to the output plate when the power transmitted from the engine is lower than a maximum torque of the engine, and
  wherein the cushion member is capable of attenuating fluctuations in torque applied from the engine in a route through which the power from the drive source is transmitted to the output plate and transmitting the torque to the output plate when the power transmitted from the engine is equal to or higher than the maximum torque of the engine.

8. The torque fluctuation absorber according to claim 7, wherein:
  the cushion member is disposed in at least one of the first elastic member and the second elastic member; and
  the cushion member has a natural length that is longer than a length of the one of the elastic members, in which the cushion member is disposed, measured when the elastic member is fully compressed.

9. The torque fluctuation absorber according to claim 2, further comprising a cushion member having an elastic modulus that is greater than each of an elastic modulus of the first elastic member and an elastic modulus of the second elastic member,
  wherein the power source is an engine,
  wherein the first elastic member and the second elastic member are capable of attenuating fluctuations in torque applied from the engine in conjunction with each other and transmitting the torque to the output plate when the power transmitted from the engine is lower than a maximum torque of the engine, and
  wherein the cushion member is capable of attenuating fluctuations in torque applied from the engine in a route through which the power from the drive source is transmitted to the output plate and transmitting the torque to the output plate when the power transmitted from the engine is equal to or higher than the maximum torque of the engine.

10. The torque fluctuation absorber according to claim 9, wherein:
  the cushion member is disposed in at least one of the first elastic member and the second elastic member; and
  the cushion member has a natural length that is longer than a length of the one of the elastic members, in which the cushion member is disposed, measured when the elastic member is fully compressed.

11. The torque fluctuation absorber according to claim 1, further comprising a cushion member having an elastic modulus that is greater than each of an elastic modulus of the first elastic member and an elastic modulus the second elastic member,
  wherein the power source is an engine,
  wherein the first elastic member and the second elastic member are capable of attenuating fluctuations in torque applied from the engine in conjunction with each other and transmitting the torque to the output plate when the power transmitted from the engine is lower than a maximum torque of the engine, and
  wherein the cushion member is capable of attenuating fluctuations in torque applied from the engine in a route through which the power from the drive source is transmitted to the output plate and transmitting the torque to the output plate when the power transmitted from the engine is equal to or higher than the maximum torque of the engine.

12. The torque fluctuation absorber according to claim 11, wherein:
  the cushion member is disposed in at least one of the first elastic member and the second elastic member; and
  the cushion member has a natural length that is longer than a length of the one of the elastic members in which the cushion member is disposed, measured when the elastic member is fully compressed.

13. A torque fluctuation absorber, comprising:
  an output plate that is disposed so as to be rotatable about an axis of rotation;
  a first rotating plate that is disposed so as to be movable relative to the output plate in a direction of rotation of the output plate;
  a first elastic member that is engaged with the output plate and the first rotating plate, and that is capable of transmitting power applied to the first rotating plate to the output plate;
  an input plate which is rotatably disposed, and to which power is applied from a power source;
  a second rotating plate that is disposed so as to be movable relative to the input plate in a direction of rotation of the input plate, and that is capable of transmitting power to the first rotating plate;
  a second elastic member that is engaged with the input plate and the second rotating plate, and that is capable of transmitting the power applied to the input plate to the second rotating plate; and
  a power transmission control mechanism that is capable of controlling power to be applied from the second rotating plate to the first rotating plate,
  wherein the first elastic member and the second elastic member are disposed so as to be offset from each other in a radial direction of the output plate in a planar view from the axis of rotation, wherein an elastic modulus of the second elastic member is smaller than an elastic modulus of the first elastic member, wherein the power transmission control mechanism is disposed on an outer side of the first elastic member in the radial direction of the output plate, and wherein the second elastic member is disposed on an open side of a recess defined by the first elastic member and the power transmission control mechanism.

14. The torque fluctuation absorber according to claim 13, further comprising a cushion member having an elastic modulus that is greater than each of an elastic modulus of the first elastic member and an elastic modulus of the second elastic member, wherein the cushion member is disposed in at least one of the first elastic member and the second elastic member.

* * * * *